(12) United States Patent
Islam et al.

(10) Patent No.: US 8,270,936 B2
(45) Date of Patent: *Sep. 18, 2012

(54) METHOD AND APPARATUS FOR THE AUTOSELECTION OF AN EMERGENCY NUMBER IN A MOBILE STATION

(75) Inventors: Muhammad Khaledul Islam, Ottawa (CA); Asif Hossain, Kanata (CA)

(73) Assignee: Research In Motion Limited, Waterloo, ON (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/235,547

(22) Filed: Sep. 19, 2011

(65) Prior Publication Data

US 2012/0009893 A1    Jan. 12, 2012

Related U.S. Application Data

(63) Continuation of application No. 11/048,766, filed on Feb. 3, 2005, now Pat. No. 8,045,953.

(51) Int. Cl.
*H04W 1/00* (2006.01)

(52) U.S. Cl. ............... 455/404.1; 455/414.1; 455/404.2; 455/456; 455/521

(58) Field of Classification Search ............... 455/404.1, 455/404.2, 521, 456, 414.1
See application file for complete search history.

(56) References Cited

U.S. PATENT DOCUMENTS

| | | | |
|---|---|---|---|
| 5,890,061 A | 3/1999 | Timm et al. | |
| 6,035,187 A | 3/2000 | Franza | |
| 6,070,065 A | 5/2000 | Armbruster et al. | |
| 6,073,005 A | 6/2000 | Raith et al. | |
| 6,625,457 B1 * | 9/2003 | Raith | 455/456.1 |
| 6,947,760 B2 | 9/2005 | Weisshaar et al. | |
| 6,983,171 B2 * | 1/2006 | Van Bosch et al. | 455/557 |
| 7,113,764 B1 * | 9/2006 | Jang et al. | 455/404.1 |
| 8,045,953 B2 * | 10/2011 | Islam et al. | 455/404.1 |
| 2002/0160815 A1 | 10/2002 | Patel et al. | |
| 2006/0125626 A1 | 6/2006 | Govindaraj | |
| 2007/0293186 A1 | 12/2007 | Lehmann | |

FOREIGN PATENT DOCUMENTS

| | | |
|---|---|---|
| EP | 1061716 | 12/2000 |
| EP | 1253798 | 10/2002 |
| GB | 2360176 | 9/2001 |

* cited by examiner

*Primary Examiner* — Amancio Gonzalez
(74) *Attorney, Agent, or Firm* — Moffat & Co.

(57) ABSTRACT

A method and apparatus for the selection of an emergency number in a mobile station having a geographic indicator, the method comprising the steps of and the apparatus characterized by means for: determining whether a user is attempting to reach an emergency service provider; and if the user is attempting to reach an emergency service provider, connecting to a network if the mobile station is not already connected to a network; looking up an emergency dial string in a look-up table based on the geographic indicator and the network connected to; and sending the emergency dial string.

20 Claims, 5 Drawing Sheets

METHOD AND APPARATUS FOR THE AUTOSELECTION OF AN EMERGENCY NUMBER IN A MOBILE STATION

RELATED APPLICATIONS

The present application is a continuation of U.S. patent application Ser. No. 11/048,766, filed Feb. 3, 2005, the entire contents of which are incorporated herein by reference.

FIELD OF THE APPLICATION

The present application relates to a method and apparatus for the autoselection of an emergency number in a mobile station and, in particular, relates to the use of the geographic indicator to select an appropriate emergency number to call from a mobile station.

BACKGROUND

Emergency numbers for mobile stations are not globally unique and vary from country to country. Examples of valid emergency numbers include 911, *911 and #911 in North America, 112 and 119 in South Korea, 111 in New Zealand, 000 and 106 in Australia, 110, 119 and 112 in China, among others.

In many mobile devices, emergency numbers may be automatically dialled by selecting an emergency call feature from a menu. Typically, a carrier specifies the valid emergency numbers that a mobile device must be programmed with at the factory. For example, in North America, carriers generally program the mobile device to include 911, #911 and *911 as the emergency numbers. This is required since mobile station treats valid emergency numbers differently than other numbers. If the mobile station recognizes a dialed number as one of the emergency numbers, then it executes a special network determination algorithm to a acquire a network even if it is not preferred or even if the mobile station does not have a valid SIM or equivalent network configuration information.

Some carriers may add other numbers in anticipation of roaming in other countries. Alternatively, other numbers could be meant for specific types of emergency services such as emergency text telephony for the deaf (known as TTY).

The expectation from carriers is that a user will know the emergency number of the country that they are in and manually dial that number. This is, however, inconvenient and potentially dangerous when a user is roaming in a country that he or she may not know the emergency number in. Further, when a mobile device or the keypad is locked, a user typically cannot manually dial an emergency number without manually unlocking it first and the only option is to select an emergency call item from a menu if the menu option is available on the mobile station. In this case, mobile station typically chooses a number from the list of valid emergency numbers. In some cases, the dialed number may not be the appropriate emergency number in the geographical area when the call is placed.

Some prior art solutions have attempted to address the above difficulty in part. For example, UK Patent Application GB 2,360,176 to Charbonnier teaches a method and system in which a mobile station automatically senses when an emergency number has been dialled and captures that call. The emergency block then automatically decamps from the network that the user is currently on and connects to an overlaid emergency network. Alternatively, if an emergency network is not available, the application teaches connecting to an emergency number on the public network the user is already connected to.

The problem with the Chabonnier solution is that it does not consider geographic location and is merely directed to facilitating the emergency call completion on either an emergency network by decamping automatically and then camping onto the overlaid emergency network, or by dialling a number on the public network if an emergency network is not available.

SUMMARY

The present system and method seek to overcome the above disadvantages by obtaining a geographic indicator and using this geographic indicator, along with other options set on the mobile station, to determine the appropriate emergency number that should be dialled. Specifically, if the mobile station is operating on a code division multiple access (CDMA) wireless network, a mobile country code (MCC) is broadcast on the paging channel of the CDMA network. Prior to sending the emergency call origination message, the mobile station is required to receive all the system parameters including the MCC pursuant to CDMA standards. To resolve the ambiguity of what number to dial in an emergency, the mobile station device maintains a look-up table that maps the current MCC to the primary emergency number for a given service. The device can use this look-up table to select the appropriate emergency number for a given service and the emergency call can then be completed.

Further, when using a menu-driven emergency call, such as when the mobile station is locked, the mobile station can again use the look-up table to connect to the appropriate number.

In the case of certain options being set on the mobile station, the mobile station can use these options to select the appropriate number to dial. For example, if using TTY, many countries include a different number for placing an emergency call using TTY than for non-TTY. Thus, the look-up table could include both an option for a non-TTY emergency and a TTY emergency and the mobile station could check whether a variable is set to use or not to use TTY. This could, for example, be located in persistent memory on the mobile station and merely be a bit toggled on or off to indicate whether TTY is required.

Further, the above is applicable to a multi-mode mobile station that supports different air interface technologies. For example, if connected to a CDMA network, the mobile station applies one rule to decide the emergency number and if it is on a GSM/GPRS network then it uses the appropriate number for that type of air interface. This could also be stored in the look-up table.

As will be appreciated by those skilled in the art, other options exist including the use of GPS-based coordinates instead of the MCC.

The present application therefore provides a method for the selection of an emergency number in a mobile station having a geographic indicator, the method comprising the steps of: determining whether a user is attempting to reach an emergency service provider; and if the user is attempting to reach an emergency service provider, connecting to a network if the mobile station is not already connected to a network; looking up an emergency dial string in a look-up table based on the geographic indicator and the network connected to; and sending the emergency dial string.

The present application further provides a mobile apparatus capable of selecting an emergency number based on a geographic indication, characterized by means for: determining whether a user is attempting to reach an emergency service provider; and if the user is attempting to reach an emergency service provider, connecting to a network if the mobile station is not already connected to a network; looking up an emergency dial string in a look-up table based on the geographic indicator and the network connected to; and sending the emergency dial string.

BRIEF DESCRIPTION OF THE DRAWINGS

The present system and method will be better understood with reference to the drawings in which.

DETAILED DESCRIPTION OF THE DRAWINGS

Reference is now made to the drawings.

In the examples below, the geographic identifier is identified as the mobile country code (MCC) of a CDMA wireless network. However, as will be appreciated by those skilled in the art, other geographical indicators could be used, including, but not limited to, the use of a global positioning system location and a look-up table.

Figure 1:
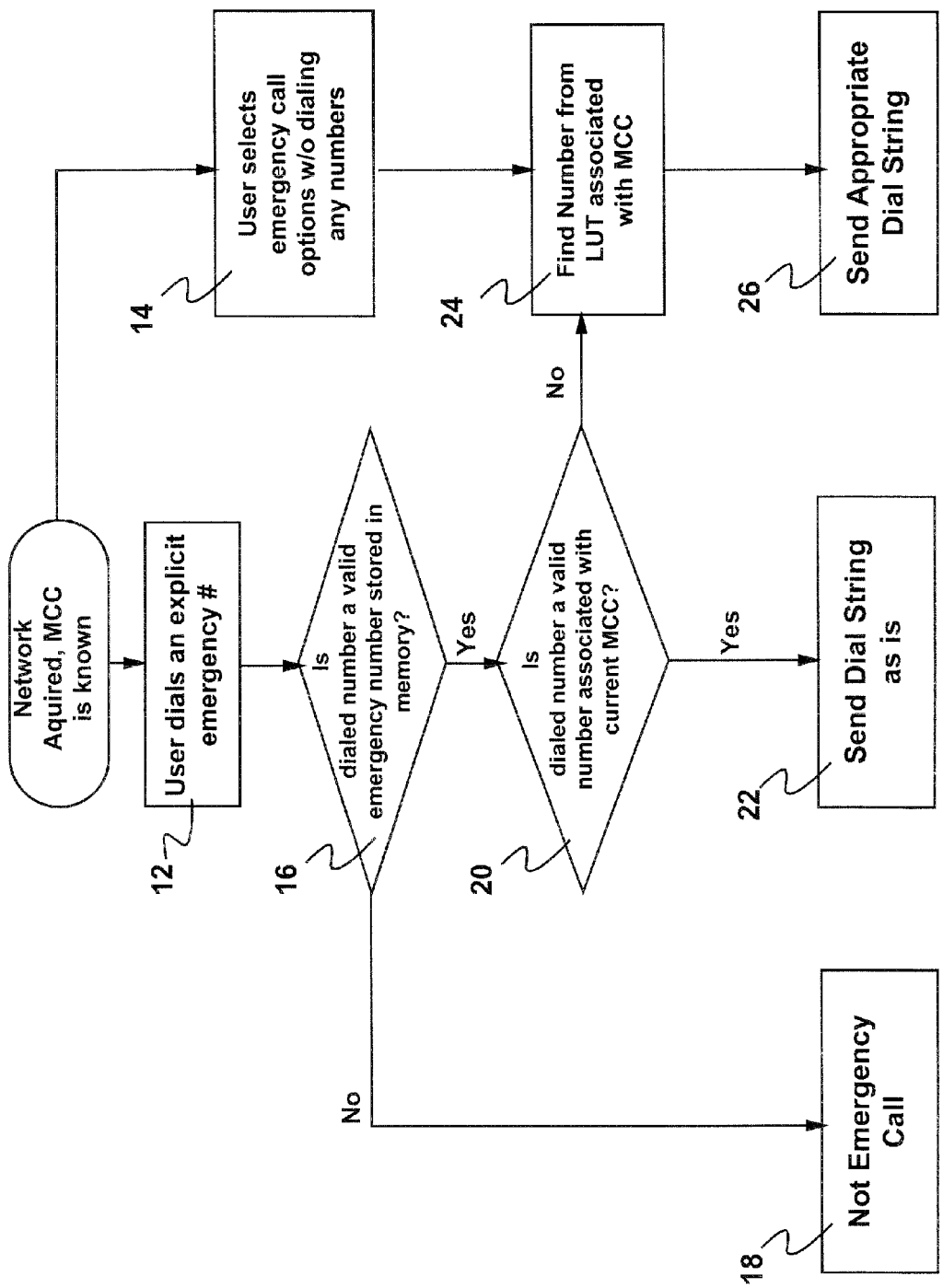
FIG. 1 is a flow chart showing an exemplary method according to the present application when a network is already acquired and a geographic indicator is known.

Reference is made to FIG. 1. In the case where a mobile station has already acquired a network and a geographic indicator such as the MCC is known, a mobile station could send an appropriate emergency number according to the exemplary flow chart of this diagram. Specifically, a user can enter an emergency number in one of two ways. A first method is to explicitly dial an emergency number as indicated in step 12. Alternatively, the user could select emergency call option from a menu, a dedicated button or any other means to select an emergency number without dialling it in step 14.

If the user dials a number explicitly in step 12, the mobile station proceeds to step 16 in which a determination is made as to whether the dialed number is a valid emergency number as stored in memory.

As will be appreciated by those skilled in the art, a look-up table could exist in the memory of a mobile station which includes all of the known emergency numbers for various regions. For example, an exemplary table could be the following:

TABLE 1

| Country | MCC | Emergency Number |
|---|---|---|
| Australia | 505 | 000 |
| Canada | 302 | 911 |

TABLE 1-continued

| Country | MCC | Emergency Number |
|---|---|---|
| South Korea | 450 | 112 |
| New Zealand | 530 | 111 |
| U.S.A. | 310-316 | 911 |

Using a look-up table as indicated in Table 1, the mobile station could go through the list of emergency numbers to indicate whether or not the number dialed corresponds with any of the emergency numbers in the table.

If in step 16 it is determined that the number dialed is not a number located within the above table or not an emergency number identified through other means, the mobile station proceeds to step 18 in which it identifies the call as a non-emergency call and the mobile station proceeds as it would during a regular call.

Conversely, if in step 16 the mobile station determines that the number dialled is an emergency number, the mobile station next checks to see whether the number dialled is a valid number associated with the current MCC for the network the mobile station is currently connected to. This is accomplished using the table above and checking whether the number dialled corresponds with the emergency number in the table for the current MCC. If in step 20 it is determined that the numbers match, the mobile station proceeds to step 22 in which the dial string is sent as is. Alternatively, if the dial string does not match the number in the table corresponding with the MCC that the mobile station is currently in, the number is found from the look-up table in step 24 and the mobile station proceeds to step 26 in which the appropriate emergency dial string replaces the dial string the user entered.

The above therefore replaces the number the user dialed with the appropriate number. Thus, if a user whose home network is in North America but is roaming in Australia dials 911, the mobile station will recognize that this is an emergency call and will replace the 911 with 000 according to the above table.

Alternatively, a user may have an option of selecting an emergency call without dialing any numbers. This can, for example, be done through a menu or in certain cases through a dedicated button on the mobile station. A mobile station that is locked (e.g. keypad is locked) will, for example, only have a few options including selecting emergency dialing. If the user selects an emergency call option without dialing any numbers, the mobile station proceeds through step 14 directly to step 24. In this way, the mobile station looks up the appropriate emergency call number associated with the MCC and this is sent in step 26.

The selection of an appropriate emergency number based on a table and geographic indicator thus overcomes deficiencies in the prior art by ensuring that a user can call an emergency number when roaming, even if the mobile station is locked. Further, the emergency number dialed will be the appropriate number for that location rather than the number associated with the user's home network.

As will be appreciated by those skilled in the art, in step 24 the mobile station can find the number from the look-up table associated with the MCC. However, the mobile station could further use other parameters to find an alternative number. For example, teletype services for the deaf or hearing-impaired (TTY) is one option on many mobile stations. If the TTY option is set, the mobile station may be required to contact a different number than a non-TTY emergency number.

This could be illustrated within a table as follows:

TABLE 2

| Country | MCC | Non-TTY Emergency Number | TTY Emergency Number |
|---|---|---|---|
| Australia | 505 | 000 | 106 |
| Canada | 302 | 911 | 911 |
| South Korea | 450 | 112 | 112 |
| New Zealand | 530 | 111 | 111 |
| U.S.A. | 310-316 | 911 | 911 |

As illustrated in the table above, Australia has a different number for a non-TTY emergency than for a TTY emergency. Therefore, the mobile station in step 24 could determine whether a parameter has been set on the mobile station indicating whether the user prefers a TTY or a non-TTY service and based on this parameter send the appropriate dial string in step 26.

In a further alternative embodiment, if the user has explicitly dialed an emergency number in step 12, step 24 may, even if the TTY parameter is set, dial the number that the user has input as long as that number is associated with the MCC. Thus, for example, if the user is in Australia and dials 000, even if the TTY option has been set on the mobile station, the mobile station in step 26 may still send 000 since the user has dialed a valid number and thus explicitly selected a non-TTY emergency number.

Figure 4:
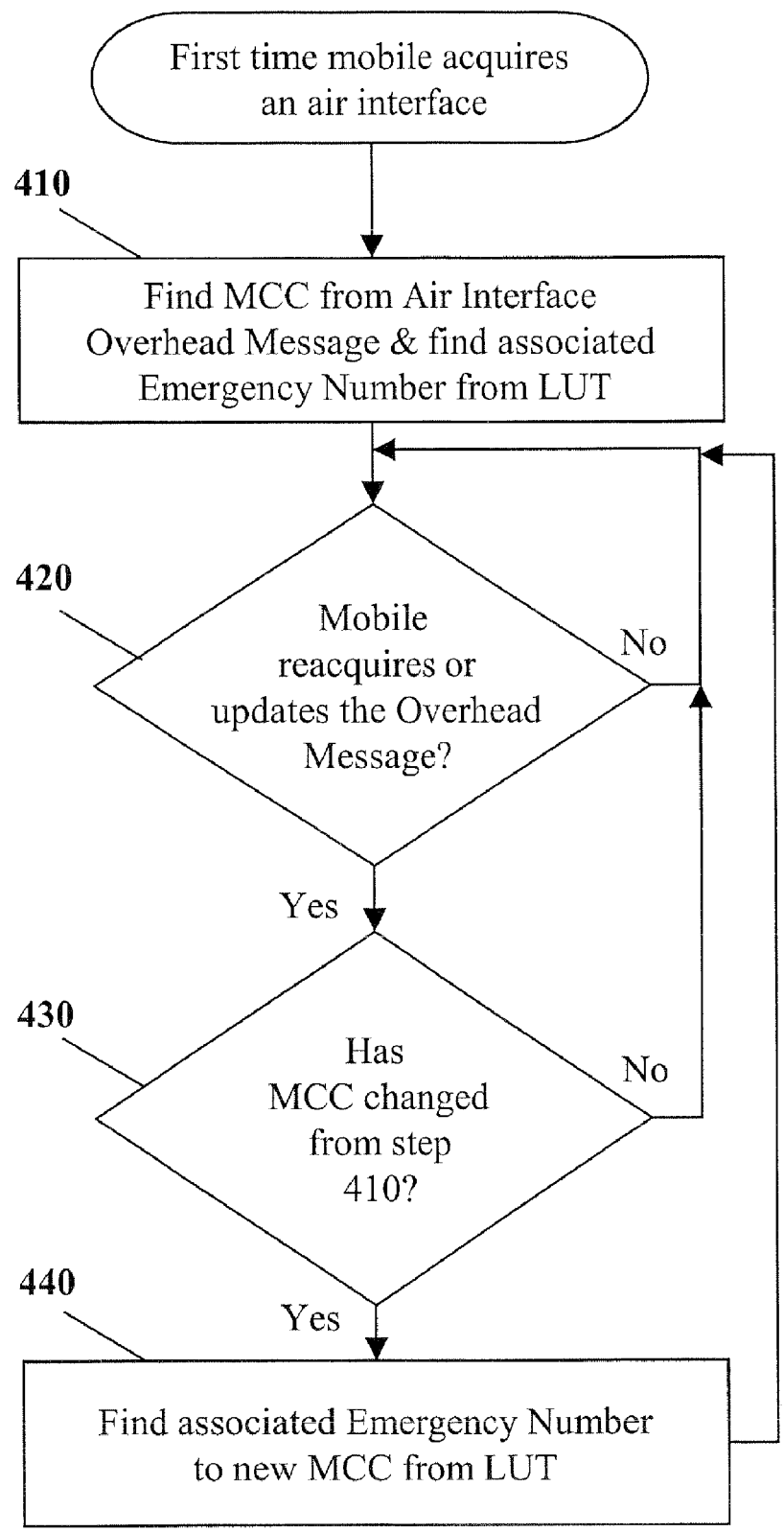
FIG. 4 is a flow chart showing a method of speeding the lookup of emergency numbers by storing current MCC and emergency number pairs upon any change in the MCC.

In order to expedite the finding of an emergency number in an emergency situation, a McC and emergency number pairing could be stored in the mobile station, for example in persistent memory. Reference is now made to FIG. 4. FIG. 4 illustrates in more detail the process involved with step 24 from FIG. 1. In FIG. 4, the first time a mobile system acquires an air interface, for example when the wireless device is turned on or when logging into a network, the mobile station proceeds to step 410. In step 410 the mobile station finds the MCC from the Air Interface Overhead Message and, based on this MCC, finds the emergency number associated with that MCC from a look up table. The mobile remembers the MCC and the emergency number pair in order to facilitate the calling of an emergency number at a future point.

The mobile station next proceeds to step 420, in step 420, the mobile station checks to see whether any operations occurred that makes the mobile reacquire of update the overhead message. This would occur, for example, if the mobile moves into a different network. If in step 420 it is found that the mobile has not performed any operation that makes it require qr update the overhead message, the mobile station loops back to step 420 and continues to check for a change.

If in step 420 something has occurred that makes the mobile require and update its overhead message, then the mobile station then proceeds to step 430. In step 430 the mobile station checks to see whether the MCC has changed from step 410. If no, the mobile station then proceeds back to step 420 and again continues to check for changes in the overhead messages for the mobile station. Conversely, if the MCC has changed, then the mobile station proceeds to step 440 in which the emergency number corresponding to the new MCC is found from a lookup table. This number is then stored in a memory location for quick access during an emergency situation. Once the correct emergency number is found from the lookup table, the mobile station proceeds back to step 420 in order to determine whether any further changes are made through the reacquisition or updating of overhead messages.

Figure 2:
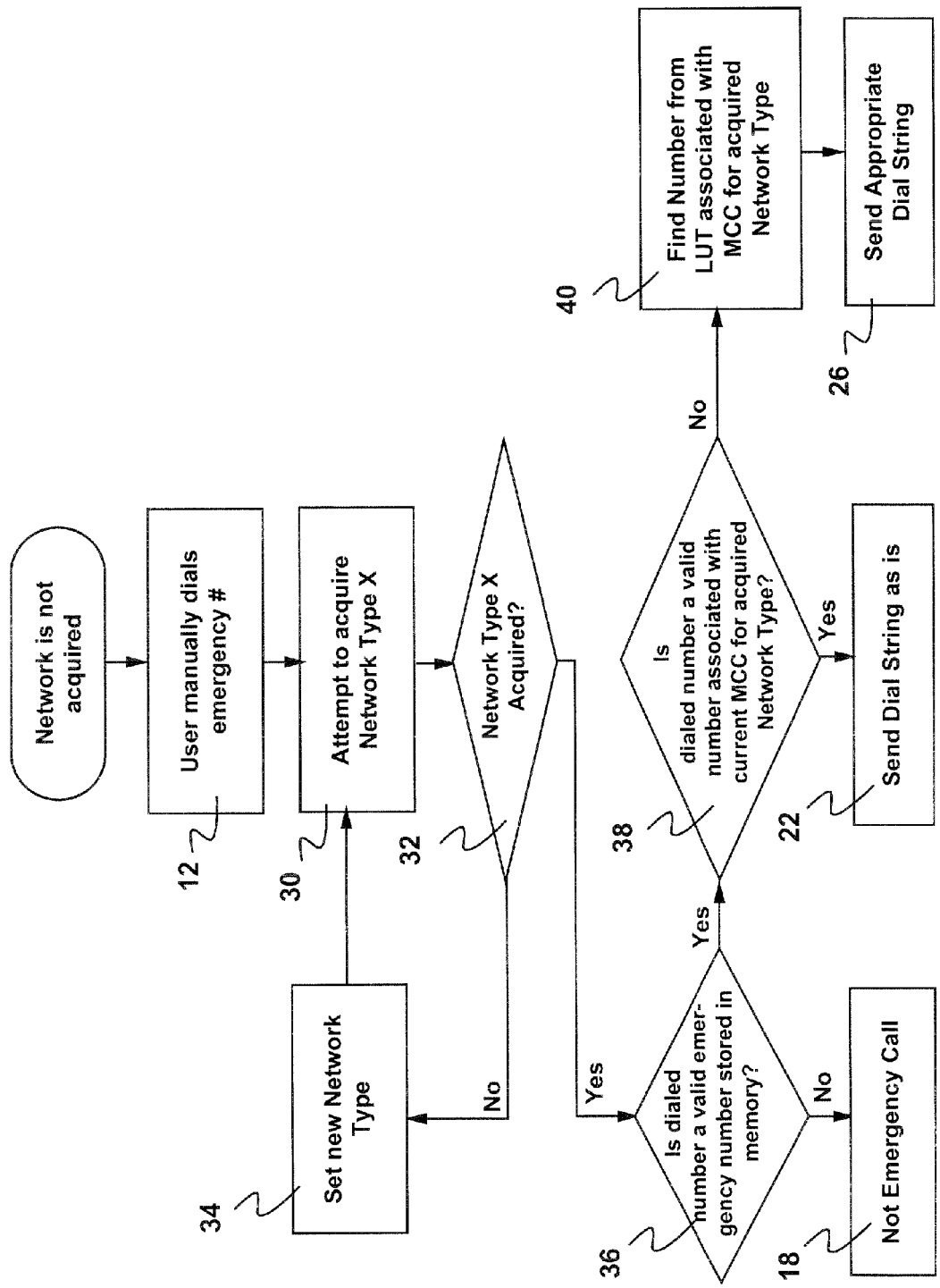
FIG. 2 is a flow chart showing an exemplary method according to the present invention when a network is not acquired at the time that an emergency number is attempted to be called manually.

Reference is now made to FIG. 2. FIG. 2 illustrates a flow chart in which a network is not acquired and in which the user attempts to manually dial an emergency number. In the case of FIG. 2, the mobile station first attempts to acquire a network of a first default type in step 30. In step 32, the mobile station then checks whether the network was acquired.

If in step 32 it is determined that a network was not acquired, the mobile station next proceeds to step 34. In the case of a mobile station that supports multiple air interface technologies, in step 34 a new network type can be set. Alternatively, if the mobile station does not support different air interface technologies, then in step 34 no new network type is set and the mobile station proceeds back to step 30 in which it attempts to acquire a network.

A look-up table preferably exists to allow the mobile station to look up the appropriate number for the appropriate air interface. For example, in some CDMA networks, one rule is applied to deciding the emergency number, whereas in a GSM/GPRS network, a different number could be used (for example, 112). For example, if the user dials 000 on a multi-mode device, assuming that a CDMA network can be acquired, if the device fails to acquire a CDMA network, it can then attempt to acquire a GSM system and automatically change the dial string to 112. As would be appreciated by those skilled in the art, the look-up table can thus be expanded to have, for example, CDMA non-TTY emergency numbers, CDMA TTY emergency numbers, GSM/GPRS numbers, and so on and use the appropriate parameters as set within the mobile station and according to the air interface, an MCC acquired in order to determine the appropriate emergency number to dial.

Once a network is acquired in step 32, the mobile station proceeds to step 36 in which it determines whether the dialed number is a valid emergency number as stored in the look-up tables. If no, the mobile station proceeds to step 18 in which it is determined that the call is not an emergency call. Alternatively, the mobile station moves to step 38 in which it checks whether the dialed number is valid for the current MCC and for the acquired network type. As indicated above, this is based on the look-up table.

If in step 38 the number is valid for both the MCC and the network type, then the mobile station proceeds to step 22 and sends the dialed string as is. Otherwise, the mobile station proceeds to step 40 in which it finds the appropriate number from the look-up table associated with both the MCC and the network type and sends this number in step 26.

Figure 3:
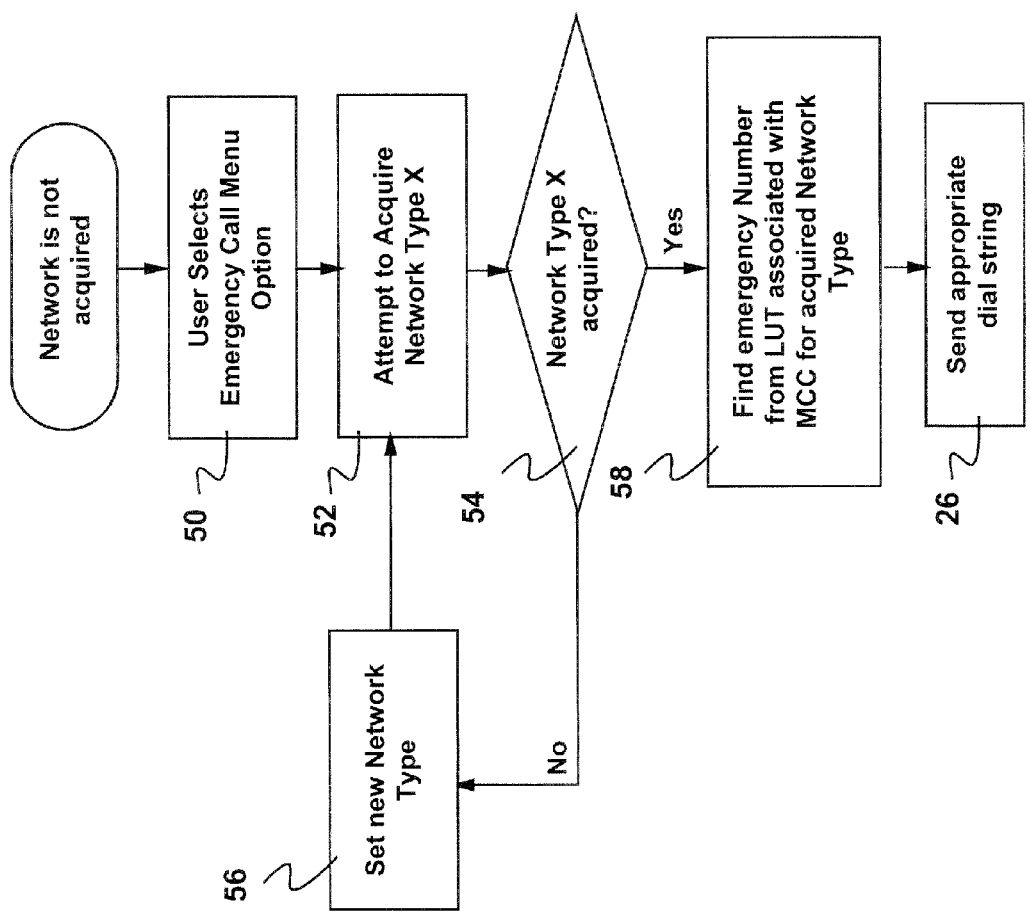
FIG. 3 is a flow chart showing an exemplary method according to the present application when the network is not acquired and the user selects emergency call menu option.

Alternatively, if the user selects to dial an emergency number from a menu option, a special button, or other means known to those skilled in the art without dialing the number manually, and if the network is not acquired, the system must then acquire a network and find the appropriate number to send. Reference is now made to FIG. 3.

The user selects an emergency call menu option in step 50 and the mobile station proceeds to step 52 in which it attempts to acquire a network of type X. In step 54, the mobile station determines whether a network has been acquired and, if not, the mobile station proceeds to step 56. As with the above, if the mobile station is a multi-mode mobile that supports multiple network or air interface technologies, then the mobile station can set a new network type in step 56 and proceed back to step 52 attempting to acquire this new network type.

Alternatively, if the mobile station is not a multiple mode mobile station, step 56 merely is ignored and the mobile station proceeds back to step 52 and attempts to acquire the network that the mobile station is capable of acquiring.

Once the mobile station acquires the network in step 54, then it proceeds to step 58 in which it determines the appropriate number by looking up in a look-up table the number for the MCC and the network type that are currently acquired. Again, other parameters such as TTY settings could also be used in step 58 to determine the appropriate number.

As will be appreciated by those skilled in the art, instead of an MCC, other geographic information such as GPS could be used in the case of a network not having an MCC. Other geographic indicators could also be used.

Once the mobile station finds the appropriate dial string in step 58, it sends this dial string in step 26.

As will be appreciated by those skilled in the art, the above works on various networks, including CDMA networks that are both second generation and third generation. Thus, the method and system could be employed on a mobile device on current networks.

As will be further appreciated, the look-up table as described above can be preprogrammed at the factory and can be updated via software upgrade or over the air provisioning or other methods known to those skilled in the art. The present method and system is not meant to be limited to any type of updating for a look-up table.

Figure 5:
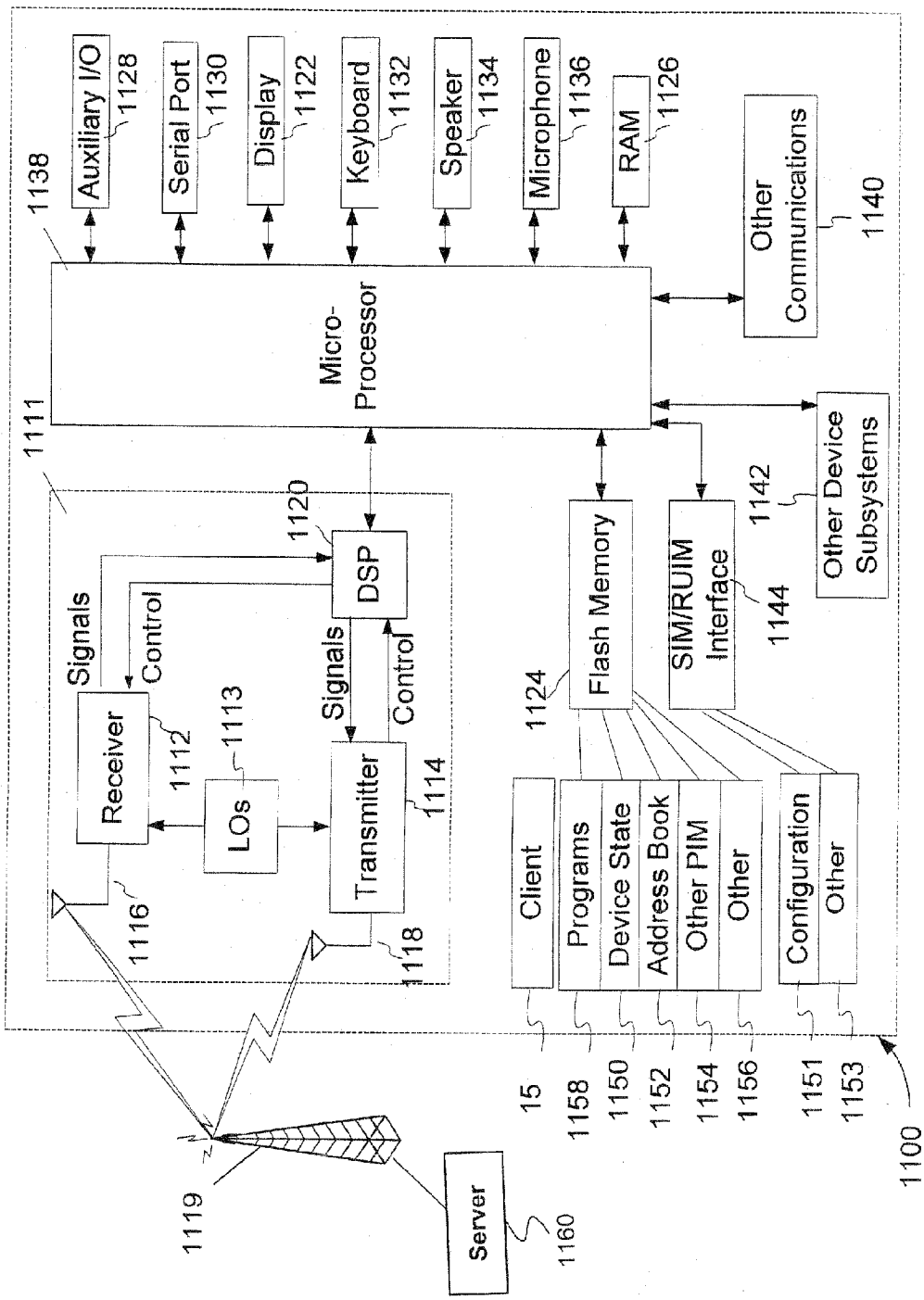
FIG. 5 is a block diagram with an exemplary mobile station that could be used in association with the present method and system.

Reference is now made to FIG. 5. FIG. 5 is a block diagram illustrating a host mobile station including preferred embodiments of the techniques of the present application. Mobile station 1100 is preferably a two-way wireless communication device having at least voice and data communication capabilities. Mobile station 1100 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1100 is enabled for two-way communication, it will incorporate a communication subsystem 1111, including both a receiver 1112 and a transmitter 1114, as well as associated components such as one or more, preferably embedded or internal, antenna elements 1116 and 1118, local oscillators (LOs) 1113, and a processing module such as a digital signal processor (DSP) 1120. As will be apparent to those skilled in the field of communications, the particular design of the communication 1111 will be dependent upon the communication network in which the device is intended to operate. For example, mobile station 1100 may include a communication 1111 designed to operate within the Mobitex™ mobile communication system, the DataTAC™ mobile communication system, GPRS network, UMTS network, EDGE network or CDMA network.

Network access requirements will also vary depending upon the type of network 1119. For example, in the Mobitex and DataTAC networks, mobile station 1100 is registered on the network using a unique identification number associated with each mobile station. In UMTS and GPRS networks, and in some CDMA networks, however, network access is associated with a subscriber or user of mobile station 1100. A GPRS mobile station therefore requires a subscriber identity module (SIM) card in order to operate on a GPRS network, and a RUIM in order to operate on some CDMA networks. Without a valid SIM/RUIM card, a GPRS/UMTS/CDMA mobile station may not be fully functional. Local or non-network communication functions, as well as legally required functions (if any) such as emergency calling, may be available, but mobile station 1100 will be unable to carry out any other functions involving communications over the network 1100. The SIM/RUIM interface 1144 is normally similar to a card-slot into which a SIM/RUIM card can be inserted and ejected like a diskette or PCMCIA card. The SIM/RUIM card can have approximately 64K of memory and hold many key configuration 1151, and other information 1153 such as identification, and subscriber related information.

When required network registration or activation procedures have been completed, mobile station 1100 may send and receive communication signals over the network 1119. Signals received by antenna 1116 through communication network 1119 are input to receiver 1112, which may perform such common receiver functions as signal amplification, frequency down conversion, filtering, channel selection and the like, and in the example system shown in FIG. 5, analog to digital (ND) conversion. A/D conversion of a received signal allows more complex communication functions such as demodulation and decoding to be performed in the DSP 1120. In a similar manner, signals to be transmitted are processed, including modulation and encoding for example, by DSP 1120 and input to transmitter 1114 for digital to analog conversion, frequency up conversion, filtering, amplification and transmission over the communication network 1119 via antenna 1118. DSP 1120 not only processes communication signals, but also provides for receiver and transmitter control. For example, the gains applied to communication signals in receiver 1112 and transmitter 1114 may be adaptively controlled through automatic gain control algorithms implemented in DSP 1120.

Network 1119 may further communicate with multiple systems, including a server 1160 and other elements (not shown). For example, network 1119 may communicate with both an enterprise system and a web client system in order to accommodate various clients with various service levels.

Mobile station 1100 preferably includes a microprocessor 1138 which controls the overall operation of the device. Communication functions, including at least data and voice communications, are performed through communication subsystem 1111. Microprocessor 1138 also interacts with further device subsystems such as the display 1122, flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 5 perform communication-related functions, whereas other subsystems may provide "resident" or on-device functions. Notably, some subsystems, such as keyboard 1132 and display 1122, for example, may be used for both communication-related functions, such as entering a text message for transmission over a communication network, and device-resident functions such as a calculator or task list.

Operating system software used by the microprocessor 1138 is preferably stored in a persistent store such as flash memory 1124, which may instead be a read-only memory (ROM) or similar storage element (not shown). Those skilled in the art will appreciate that the operating system, specific device applications, or parts thereof, may be temporarily loaded into a volatile memory such as RAM 1126. Received communication signals may also be stored in RAM 1126. Further, a unique identifier is also preferably stored in read-only memory.

As shown, flash memory 1124 can be segregated into different areas for both computer programs 1158 and program data storage 1150, 1152, 1154 and 1156. These different storage types indicate that each program can allocate a portion of flash memory 1124 for their own data storage requirements. Microprocessor 1138, in addition to its operating system functions, preferably enables execution of software applications on the mobile station. A predetermined set of applications that control basic operations, including at least data and voice communication applications for example, will normally be installed on mobile station 1100 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 1119. In a preferred embodiment, the PIM data items are seamlessly integrated, synchronized and updated, via the wireless network 1119, with the mobile station user's corresponding data items stored or associated with a host computer system. Further applications may also be loaded onto the mobile station 1100 through the network 1119, an auxiliary I/O subsystem 1128, serial port 1130, short-range communications subsystem 1140 or any other suitable subsystem 1142, and installed by a user in the RAM 1126 or preferably a non-volatile store (not shown) for execution by the microprocessor 1138. Such flexibility in application installation increases the functionality of the device and may provide enhanced on-device functions, communication-related functions, or both. For example, secure communication applications may enable electronic commerce functions and other such financial transactions to be performed using the mobile station 1100. These applications will however, according to the above, in many cases need to be approved by a carrier.

In a data communication mode, a received signal such as a text message or web page download will be processed by the communication subsystem 1111 and input to the microprocessor 1138, which preferably further processes the received signal for output to the display 1122, or alternatively to an auxiliary I/O device 1128. A user of mobile station 1100 may also compose data items such as email messages for example, using the keyboard 1132, which is preferably a complete alphanumeric keyboard or telephone-type keypad, in conjunction with the display 1122 and possibly an auxiliary I/O device 1128. Such composed items may then be transmitted over a communication network through the communication subsystem 1111.

For voice communications, overall operation of mobile station 1100 is similar, except that received signals would preferably be output to a speaker 1134 and signals for transmission would be generated by a microphone 1136. Alternative voice or audio I/O subsystems, such as a voice message recording subsystem, may also be implemented on mobile station 1100. Although voice or audio signal output is preferably accomplished primarily through the speaker 1134, display 1122 may also be used to provide an indication of the identity of a calling party, the duration of a voice call, or other voice call related information for example.

Serial port 1130 in FIG. 5 would normally be implemented in a personal digital assistant (PDA)-type mobile station for which synchronization with a user's desktop computer (not shown) may be desirable. Such a port 1130 would enable a user to set preferences through an external device or software application and would extend the capabilities of mobile station 1100 by providing for information or software downloads to mobile station 1100 other than through a wireless communication network. The alternate download path may for example be used to load an encryption key onto the device through a direct and thus reliable and trusted connection to thereby enable secure device communication.

Other communications subsystems 1140, such as a short-range communications subsystem, is a further optional component which may provide for communication between mobile station 1100 and different systems or devices, which need not necessarily be similar devices. For example, the subsystem 1140 may include an infrared device and associated circuits and components or a Bluetooth™ communication module to provide for communication with similarly enabled systems and devices.

The exemplary mobile station of FIG. 5 is meant to be illustrative and other devices with more or fewer features than the above could equally be used for the present method and apparatus.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for automatically selecting an emergency number appropriate to a geographical area during roaming of a mobile device, the method comprising:
   a. storing in memory on said device valid dial strings corresponding to an emergency number for each of a plurality of network types supported by said mobile device;
   b. upon receipt of a dial string generated at said mobile device attempting to acquire a network of a first default type;
   c. upon failure to acquire said network of said first default type, setting a network type to a new network type different to said first default type and attempting to acquire said new network;
   d. upon acquiring said network, determining whether said dial string generated is a valid emergency number; upon a valid emergency number being asserted;
   e. selecting from said memory an emergency call dial string for an emergency service provider associated with the acquired network; and
   f. placing an emergency call to the emergency service provider using the selected emergency call dialstring.

2. The method of claim 1, including storing on said device a preset parameter indicative of a preferred number associated with a geographic region.

3. The method of claim 1, including storing on said device a look-up table of emergency dial strings based on a geographic indicator, network type, and a preset parameter.

4. The method of claim 2, connecting to a network if the mobile station is not already connected to any network to obtain a geographic indicator from the network.

5. The method of claim 4, obtaining the geographic indicator from the network if the mobile device is already connected to a network.

6. The method of claim 5, including obtaining the emergency call dial string from the look-up table based on the obtained geographic indicator, the network type, and the preset parameter stored on the mobile station.

7. The method of claim 6, the preset parameter for indicating whether a TTY service associated with the geographic region is to be used.

8. The method of claim 6, wherein the preset parameter is represented by a bit located in persistent memory on the mobile station.

9. The method of claim 1, the dial strings generated at said mobile station being generated when an emergency call option is selected on the mobile station.

10. The method of claim 1, wherein placing the emergency call further comprises comparing the dial string generated with the obtained emergency dial string, and if the two dial strings are not the same, replacing the dial string generated with the obtained emergency dial string.

11. The method of claim 2, wherein the network is a code division multiple access network and the geographic indicator is a mobile country code.

12. The method of claim 2, wherein the geographic indicator is a global positioning system signal.

13. The method of claim 1, including connecting to a second network type if failure is experienced when connected to a first acquired network type.

14. The method of claim 13, wherein the first network type is a code division multiple access (CDMA) network and the second network type is a global system for mobile communications (GSM) network.

15. A mobile device configured to place an emergency call by automatically selecting an emergency number appropriate to a geographical area during roaming, comprising:
 a processor and a communication subsystem configured for,
  a. storing in memory on said device valid dial strings corresponding to an emergency number for each of a plurality of network types supported by said mobile device;
  b. upon receipt of a dial string generated at said mobile device attempting to acquire a network of a first default type
  c. upon failure to acquire said network of said first default type, setting a network type to a new network type different to said first default type and attempting to acquire said new network;
  d. upon acquiring said network, determining whether said dial string generated is a valid emergency number;
  e. upon a valid emergency number being asserted selecting from said memory an emergency call dial string for an emergency service provider associated with the acquired network; and
  f. placing an emergency call to the emergency service provider using the selected emergency call dial string.

16. The mobile device of claim 15, further comprising means for determining that the dial strings generated are by an emergency call option being selected on the mobile station.

17. The mobile device of claim 15, including:
 a comparator arranged to compare the dial string generated with an obtained emergency dial string, and
 means arranged to replace the dial string entered with the obtained emergency dial string if the two dial strings are not the same.

18. The mobile device of claim 15, wherein the network is a code division multiple access network-and-emergency dial strings are associated with a geographic indicator.

19. The mobile device of claim 18, wherein the geographic indicator is a global positioning system signal.

20. The mobile device of claim 15, the communication subsystem is configured to connect to a second network type if failure is experienced when connected to a first acquired network type.

\* \* \* \* \*